Feb. 17, 1931.  E. F. BRUNNER  1,792,808
VEHICLE WHEEL MOUNTING
Original Filed Sept. 27, 1927
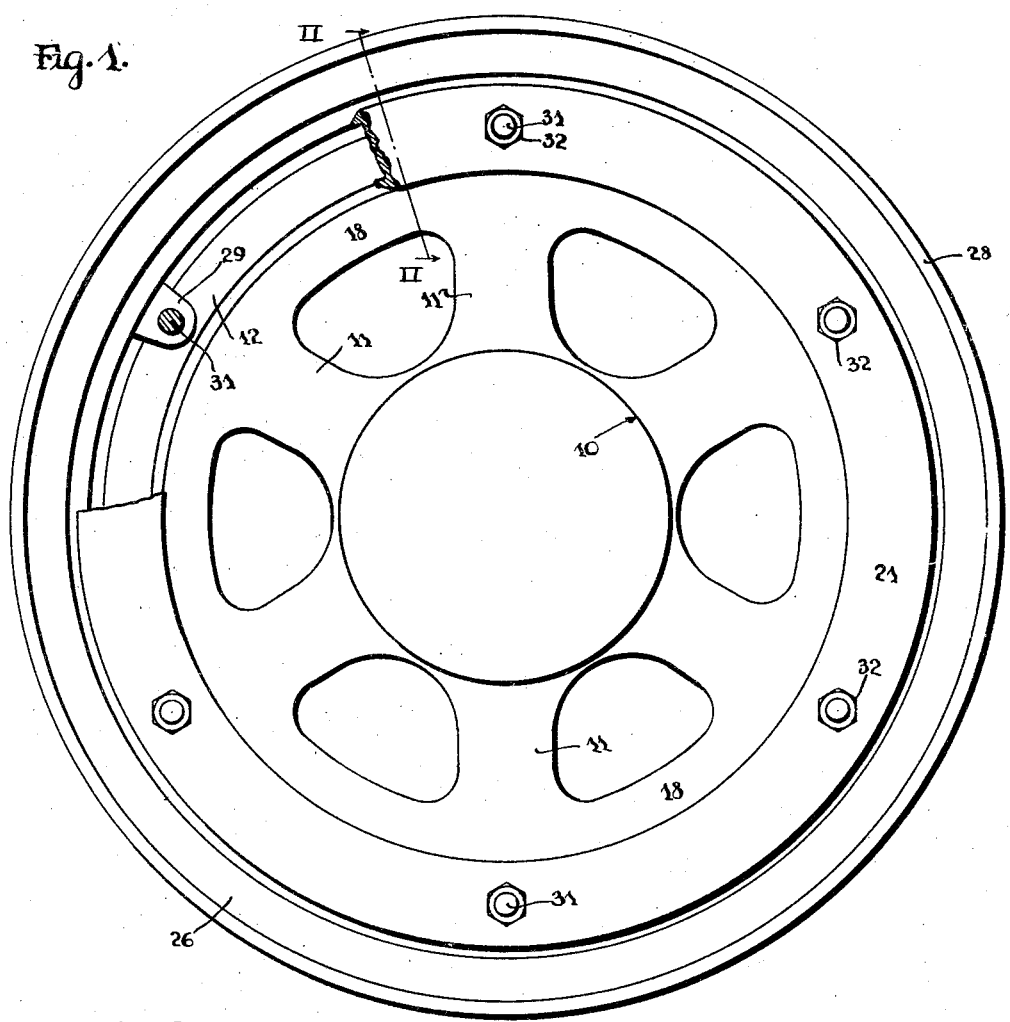
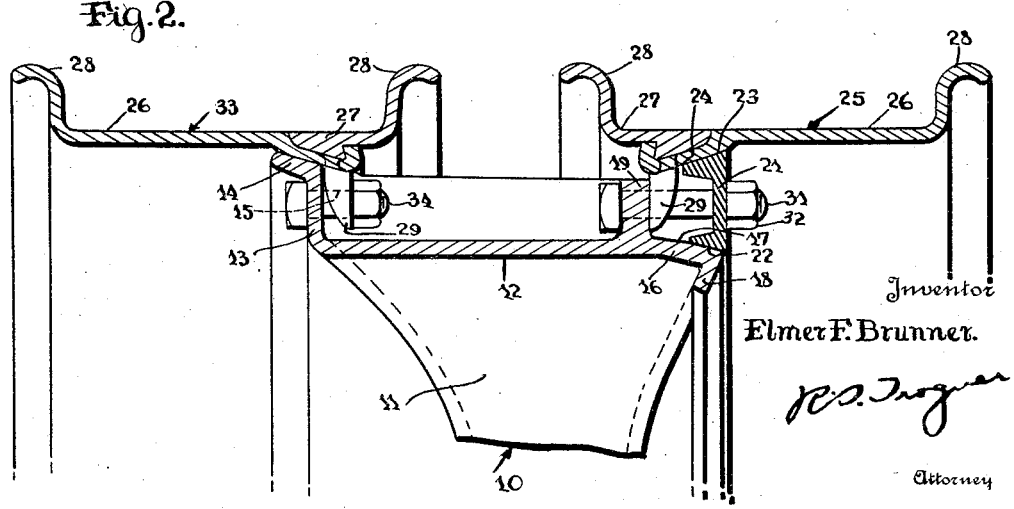
Inventor
Elmer F. Brunner.
Attorney Patented Feb. 17, 1931

1,792,808

UNITED STATES PATENT OFFICE

ELMER F. BRUNNER, OF AKRON, OHIO, ASSIGNOR TO THE GOODYEAR TIRE & RUBBER COMPANY, OF AKRON, OHIO, A CORPORATION OF OHIO

VEHICLE WHEEL MOUNTING

Original application filed September 27, 1927, Serial No. 222,267. Divided and this application filed August 2, 1928. Serial No. 297,008.

My invention relates to rim mountings for vehicle wheels and it has particular relation to so-called dual rim mountings wherein a plurality of tire-carrying rims are mounted upon a common felloe. This application is a division of my co-pending application Serial No. 222,267, filed September 27, 1927.

One object of my invention is to provide a simple, practical and inexpensive form of dual mounting.

A further object of the invention lies in the provision of novel means for securing the rims upon the wheel felloe.

Other objects and advantages to be derived from the practice of my invention will become apparent from a perusal of the following specification in which one embodiment of the invention is described in detail, reference being had to the accompanying drawings, wherein:

Figure 1 is a side elevational view, partly broken away, illustrating a wheel assembly embodying my invention; and Figure 2 is a cross-sectional view showing the relation of the parts forming the wheel assembly shown by Figure 1, the view being taken substantially along the line II—II thereof.

In the embodiment of the invention illustrated in the accompanying drawings a wheel 10, preferably constructed of cast metal, embodies spokes 11 and a felloe 12 integral therewith or otherwise rigidly secured thereto. The felloe 12 is provided adjacent its inner edge with a radially disposed flange 13, terminating in an outwardly inclined rim-seating portion 14. The flange 13 is provided with a plurality of apertures 15 for the reception of rim securing means.

A portion 16 of the felloe 12 remote from the flange 13 is inclined inwardly to provide a tapered seating surface 17 and terminates in an inwardly extending annular portion 18 integral with the spokes 11. A plurality of spaced apertured lugs 19 extend radially outwardly from the felloe 12 adjacent the end of the portion 16 thereof.

An annular ring 21 which is formed with an inner tapered seat 22 for coaction with the tapered seating surface 17 on the felloe and with an outer tapered seat 23 for coaction with a similar seating surface 24 on a rim 25 is provided with spaced apertures designed to align with the apertures in the lugs 19.

The tire supporting rim 25 preferably comprises inter-fitting annular members 26 and 27. Each of the members is formed to provide an outwardly flared tire-engaging flange 28 and the member 26, which has the seating surface 24 formed thereon, is transplit whereas the member 27 is in the form of a continuous ring.

A plurality of lugs 29 are rigidly secured to the rim member 26 and extend radially inwardly therefrom for coaction with the lugs 19. The lugs 29 are also apertured to receive securing bolts 31 which traverse the lugs 19 and 29 and the annular ring 21. Nuts 32 threaded on the bolts serve, by their engagement with the annular member 21, to secure the rim in operative position upon the felloe with the lugs 29 in engagement with the respective lugs 19.

It will be observed that the rim 25 is more securely mounted in operative position by reason of the relatively wide annular ring 21, the tapered surfaces 22 and 23 of which coact with the tapered portion 17 of the felloe and the seating face 24 of the rim respectively.

The rim 33 is similar in all respects to the rim 25 and is secured in operative position by means of bolts 34 traversing the rim lugs 29 and the radial flange 13 of the felloe.

From the foregoing description it will be apparent that my invention provides a simple and practical form of dual wheel mounting. Although I have described but a single form of the invention it will be apparent to those skilled in the art that various modifications and changes may be made therein without departing from the spirit of the invention or from the scope of the appended claims.

What I claim is:

1. A vehicle wheel mounting comprising a felloe formed with an inclined seating surface adjacent one edge thereof, lugs extending radially outwardly from the felloe in circumferentially spaced relation, a rim formed with a tapered seat and having a plurality of lugs extending inwardly therefrom for coaction with the lugs on the felloe, a wedge ring engaging the inclined seating surface and the tapered seat, and securing means traversing the rim and felloe lugs and the wedge ring.

2. A vehicle wheel mounting comprising a felloe having an inclined seating surface adjacent one edge thereof, radially disposed lugs extending outwardly from the felloe in circumferentially spaced relation, a rim formed with a tapered seat and having a plurality of radially disposed lugs extending inwardly therefrom for coaction with the lugs on the felloe, the lugs on the felloe having a diameter smaller than the least diameter of the tapered seat on the rim, and wedging means engaging the inclined seating surface and the tapered seat for securing the rim on the felloe.

In witness whereof, I have hereunto signed my name.

Signed at Akron, in the county of Summit and State of Ohio, U. S. A., this 31st day of July, 1928.

ELMER F. BRUNNER.